June 17, 1958  J. C. HOBBS  2,839,265
DOUBLE FLUID SEAL VALVE
Filed March 16, 1954
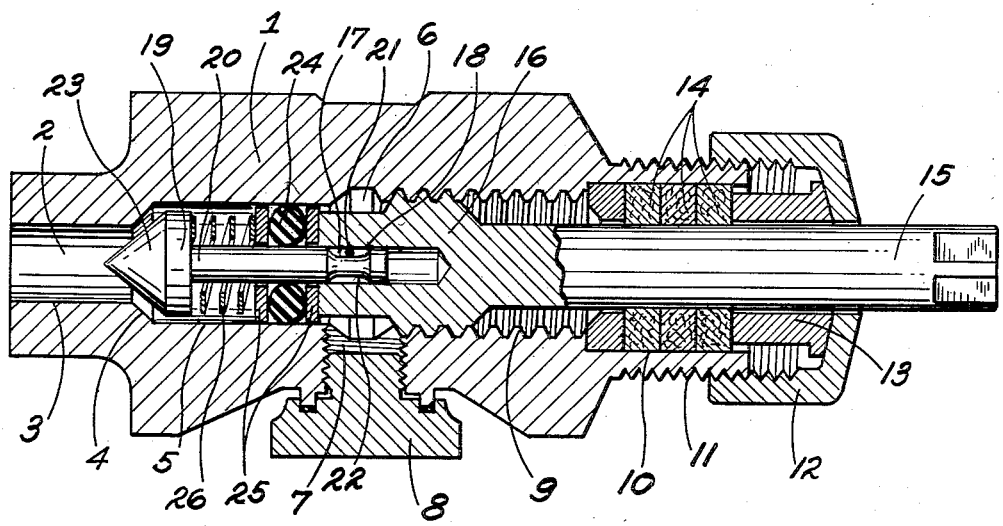
INVENTOR.
JAMES C. HOBBS
BY
RICHEY, WATTS, EDGERTON,
McNENNY & FARRINGTON.
ATTORNEYS

United States Patent Office 2,839,265
Patented June 17, 1958

2,839,265

DOUBLE FLUID SEAL VALVE

James C. Hobbs, Coral Gables, Fla.

Application March 16, 1954, Serial No. 416,579

1 Claim. (Cl. 251—85)

This invention relates generally to fluid seals and more particularly to new seals for the ends of pipes carrying fluids under high pressure.

A great many efforts have been made heretofore to prevent the escape of fluids at the ends of pipes, as in pipe couplings, joints and the like. Some of the seals proposed were fairly satisfactory in sealing against escape of low pressure fluids while other seals were fairly satisfactory in sealing thick walled pipes against escape of fluid under fairly high pressure. Most of the prior high pressure seals were heavy, cumbersome and expensive, and few, if any, of them were capable of sealing fluid pressures on the order of 1500 pounds per square inch or more when subject to rapid temperature changes.

The present invention provides a simple, light, inexpensive seal which is capable of sealing against escape of fluids whose pressures range all the way up to 40,000 pounds per square inch or more. Such seals may be used with pipes whose thicknesses range from a very thin wall such, for example, as 0.02 inch up to heavy walls such, for example, as several inches. Furthermore, the sealing effect of seals embodying the present invention increases with increases in forces tending to separate the pipe axially from its associated member and also increases with increases in the sealing force applied to the seal. From what has just been stated it will be apparent that the present invention provides a new seal which is capable of many different applications and which is not only better in many respects than prior seals but is much more effective in operation. Furthermore, as will be pointed out more in detail hereinafter, the mode of operation of seals embodying the present invention is new and different from the modes of operation of all other prior seals with which I am familiar.

The drawing accompanying and forming a part of this specification shows a preferred embodiment of the present invention.

In the drawing the valve body 1 is similar to the outlet valve body or pipe from a high-pressure-gas-containing tank; cylinder or the like, the left hand end of body 1 being shaped for suitable attachment to such a container. The bore 2 of the body 1 is of varying diameter. At its inlet end the bore is defined by a cylindrical surface 3 which merges into a conical surface 4 to form a conical valve seat where a seal is formed, and surface 4 merges into a cylindrical surface 5 where a second seal is formed. The bore 2 is enlarged beyond the other end of cylindrical surface 5 to form an annular recess 6 which, through a radial opening 7, leads to the outside of the body 1. A plug 8 serves to seal opening 7 against escape of fluid therethrough. Beyond the recess 6, bore 2 is threaded as at 9 and near its outer end is provided with a cylindrical surface 10 to serve as part of a stuffing box. The body 1 is exteriorly threaded as at 11 to receive a cap 12 which bears against the outer end of a tube 13 to press the latter against the side of a gasket 14 which, together with other similar gaskets, is disposed within, and is deformable into sealing contact with, the cylindrical surface 10.

A valve stem 15 extends inwardly through cap 12, tube 13 and gaskets 14 and has an enlarged intermediate portion 16 provided with threads on its outer surface to engage the threads 9 of the body. The inner end 16 of valve stem 15 is provided with an axial recess 17 having cylindrical side wall 18. A valve 19 is assembled with the inner end of stem 15. This valve has a shank 20 extending into the recess 17 of the stem. A pin 21 which is carried by stem 15 extends across recess 17 and lies in an annular depression 22 of shank 20 and serves to prevent separation of the valve and stem while permitting relative rotation and limited relative endwise movement. Valve 19 has a conical end surface 23 shaped to engage conical surface 4 with sealing contact against the flow of high pressure fluid therebetween. Preferably, surfaces 4 and 23 define therebetween a small included angle of about 2° which assures that the initial sealing contact will be substantially a line contact but that the axial length of such contact will increase with increased pressure applied to the valve by the valve stem. This engagement of surfaces 4 and 23 constitutes one fluid seal.

Means for forming a second seal is provided between the head of valve 19 and the inner end of stem 15. This means includes a deformable packing means 24, washers 25 on either side of the packing and composed of some relatively non-deformable material, for example metal, and a spring 26 having coils of rectangular cross-section disposed between the valve head 19 and the adjacent washer 25, the other washer lying between the packing and the inner end of stem 15.

The operation of the device shown in the drawing and just described will be clear from a brief description. When stem 15 is rotated for axial movement toward valve 19, force is applied by the stem to the outer washer 25 and is transmitted through the packing means 24, the other washer and spring 26 to valve 19 with resultant seating of conical surface 23 on conical surface 4. During this endwise movement of stem 15, some deformation of packing means 24 may take place. After surfaces 23 and 4 are in contact, further turning movement of stem 15 will result in the application of increased pressure of surface 23 against surface 4 and in considerably increased deformation of packing means 24 with the resultant formation of a second fluid seal between the packing shank 20 and the cylindrical surface 5.

When fluid under pressure is present in the space in which spring 26 is located, that fluid will tend to seat the valve 19 on surface 4 due to the fact that the spring and fluid pressures acting on one side of valve 19 will exceed the fluid pressure acting on the other side and, hence, the tendency will be to close the valve. Also, any increase in fluid pressure and spring loading between the valve and the O-ring will tend to increase the sealing action of the O-ring.

This application is a continuation-in-part of my co-pending application, Serial No. 32,581, filed June 12, 1948, and issued on April 27, 1954, as Patent No. 2,676,781, which application was a continuation-in-part of my then copending application, Serial No. 549,533, filed on August 15, 1944, and issued on June 15, 1948, as Patent No. 2,443,187.

Having thus described the present invention so that those skilled in the art will be able to understand and practice the same, I state that what I desire to secure by Letters Patent is defined in what is claimed.

What is claimed is:

A double fluid seal comprising a valve body having a fluid passage defined in part by a substantially cylindrical surface and an adjoining substantially conical surface, a first, imperforate, circumferentially continuous member having a transverse, annular, flat, outer end surface, and an axially elongated cylindrical side surface adjacent thereto and having sliding engagement with the cylindrical surface of the body, and a sealing surface on its inner end to engage said conical surface on the body, a second imperforate, circumferentially continuous member disposed adjacent to the outer end of said first member, one of said members having an axial recess extending thereinto from one end and having a pin extending transversely through said recess, the other of said members having an axial portion projecting into said axial recess and having a groove to receive said pin, said pin serving to connect said first and second members for relative rotational and limited axial movement, annular, deformable packing between said members and remote from said conical surface and engageable with said cylindrical surface of the body, spring means between said packing and the first member and engaging the outer end surface of said first member and serving to urge said first member axially away from said packing means and said second member and to urge said packing means against said cylindrical surface to form a seal, and an axially movable rigid member integral with said second member and serving when moved toward said first member to urge the sealing surface of the latter into circumferentially continuous, fluid sealing contact with said conical surface thereby forming a first seal, and to move said imperforate members toward opposite sides of said packing and to deform the latter into circumferentially continuous fluid sealing contact with said cylindrical surface of the body thereby forming a second seal.

References Cited in the file of this patent

UNITED STATES PATENTS

| | | |
|---|---|---|
| 1,301,278 | Labus | Apr. 22, 1919 |
| 2,676,781 | Hobbs | Apr. 27, 1954 |

FOREIGN PATENTS

| | | |
|---|---|---|
| 27,909 | Great Britain | of 1908 |
| 36,409 | France | of 1930 |